No. 630,360. Patented Aug. 8, 1899.
R. L. KJERNER.
VALVE.
(Application filed Apr. 10, 1899.)

(No Model.)

Witnesses
Nancy Pendleton Ford
Jas. J. Maloney.

Inventor,
Ragnar L. Kjerner,
by J. P. and H. Livermore
Attys.

THE NORRIS PETERS CO., PHOTO-LITHO., WASHINGTON, D. C.

UNITED STATES PATENT OFFICE.

RAGNAR L. KJERNER, OF BOSTON, MASSACHUSETTS, ASSIGNOR OF ONE-HALF TO GEORGE H. GRAVES, OF MALDEN, MASSACHUSETTS.

VALVE.

SPECIFICATION forming part of Letters Patent No. 630,360, dated August 8, 1899.

Application filed April 10, 1899. Serial No. 712,392. (No model.)

*To all whom it may concern:*

Be it known that I, RAGNAR L. KJERNER, of Boston, county of Suffolk, and State of Massachusetts, have invented an Improvement in Valves, of which the following description, in connection with the accompanying drawings, is a specification, like letters on the drawings representing like parts.

The present invention relates to a valve or cock of that class in which a tapered plug having a transverse opening is supported in a valve-chamber and arranged to be turned therein, so as to bring the said opening into and out of line with the inlet and outlet of the valve-chamber. These valves are preferably made so that the casing is closed opposite the smaller end of the tapered plug and open for the insertion of the plug at the side adjacent to the larger end thereof. In this construction the actuating-stem projects from the larger end of the plug through the opening and is properly packed to prevent leakage. In valves of this class, as hereinbefore described, however, the packing has been solely depended upon to keep the plug firmly seated, it being obvious, therefore, that when much pressure is encountered, tending to lift the plug from its seat, the packing, being of a yielding nature, will not effectually prevent such lifting, so that the valve will leak, while there is nothing to hold the plug well seated if it becomes worn.

It is the object of the present invention to provide the valve or cock with means for positively locking the plug against its seat, it being further desirable that the locking means should be adjustable, so that the wear of the plug can be taken up from time to time. To this end that part of the valve which contains the valve-chamber is provided with a locking device arranged to be properly secured thereto and to coöperate with the larger end of the plug, a convenient form of such locking device comprising a screw-threaded member coöperating with an internal screw-thread at the valve-chamber opening and adapted to be screwed down against the larger end of the plug and to surround the valve-stem, which projects from the plug through said opening. The packing can then be interposed between the said locking device and a suitable gland, being thus relieved from all pressure, and therefore capable of efficient service for a much longer time.

Figure 1:
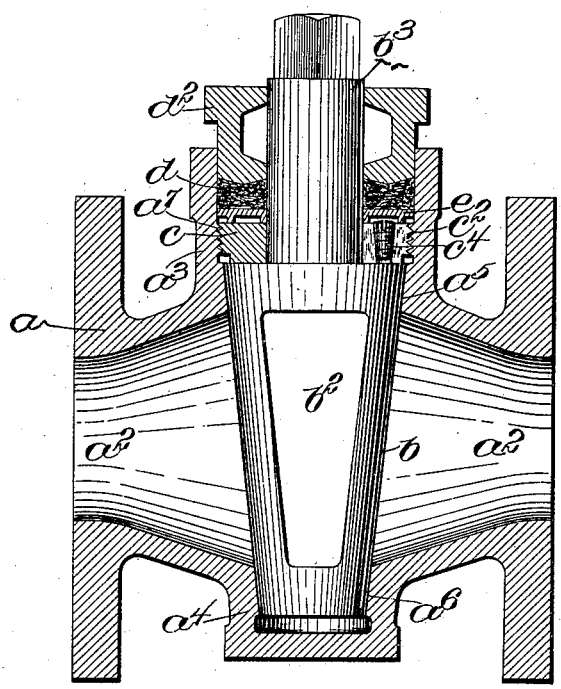
Figure 2:
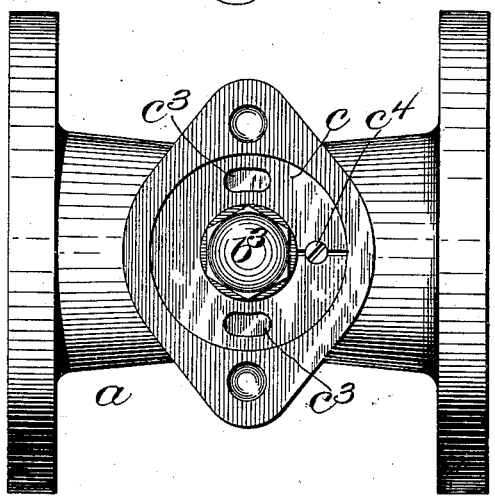

Figure 1 is a section of a valve or cock embodying the invention, and Fig. 2 is a top plan view of the same with the packing-gland removed.

The valve-casing $a$ is provided in the usual way with inlet and outlet passages $a^2$ and tubular extensions $a^3$ and $a^4$ to contain the tapered seat portions $a^5$ and $a^6$, which coöperate with the tapered plug $b$. The valve is operated in the usual way by turning the said tapered plug to bring the passage $b^2$ into or out of alinement with the open portions of the valve-chamber within the casing $a$. The projection $a^4$, which contains the smaller end of the plug $b$, is completely closed in, and the stem or actuating device $b^3$, whereby the plug $b$ is turned, extends through the extension $a^3$, which is open to the exterior of the valve.

In accordance with the present invention the plug $b$ is provided with a locking device $c$, which coöperates with the valve-casing $a$ and is arranged to be locked or connected thereto and to engage the larger end surface of the plug $b$, so as to maintain the same seated without preventing the same from being turned. As herein shown, the said locking device comprises a ring provided with an external thread $c^2$, coöperating with an internal thread $a^7$ along the wall of the extension $a^3$, and is adapted to be screwed into place by means of a spanner or suitable tool coöperating with spanner-openings $c^3$, Fig. 2. The said ring surrounds the stem $b^3$, and beyond the ring the said stem is provided with suitable packing $d$, held in position in the usual way by means of a gland $d^2$. This construction of the locking device, while not being essential, affords means for adjusting the position of the same, so that the plug can be firmly held in the position desired and still be free to turn as easily as is necessary. It is necessary, however, that the said locking device when formed in this way should be prevented from turning with relation to its thread after it has been moved to the desired position, since otherwise it would turn with the plug and become loosened or caused to bind, in accordance with the direction in which the plug is turned. To this end the said ring has a supplemental locking device, which may be of any suitable or usual construction, so that after the adjustment is effected the ring can be held stationary. As herein shown, the ring is split and provided with a tapered channel at the split portion, and said channel is provided with a tapered screw $c^4$, which on being screwed into the said channel forces the two sides of the channel apart, causing the ring to spread and bind closely in the threads $a^7$. To prevent the said tapered screw from becoming loosened to a sufficient extent to release the ring, the said screw is provided with a retaining device, herein shown as a washer $e$, of metal or other suitable unyielding substance, which is interposed between the packing $d$ and the surface of the locking device $c$. The said washer is held in position by the packing, and will effectually prevent the tapered screw from loosening to any material extent and at the same time protects the threaded portions of the locking device from the packing itself.

By the construction above described it is obvious that the tapered plug of a valve of this description can be maintained seated under all conditions and can from time to time be accurately adjusted to its seat and firmly retained in its adjusted position. The construction is especially useful where high pressures are to be controlled, since the surface exposed to fluid-pressure near the larger portion of the plug is usually greater than that near the smaller portion, so that an unbalanced pressure is exerted, tending to lift the plug from its seat and to compress the packing when the packing is relied upon solely to keep the plug seated.

It is not intended to limit the invention to the specific construction herein shown, since modifications may obviously be made without departing from the invention.

I claim—

1. In a valve or cock, the combination with the valve casing or chamber; of a tapered plug extending through the valve-chamber which is provided with a suitable seat for said plug; an actuating-stem extending from the larger end of the plug to the exterior of the chamber; a locking device inclosed in the chamber and coöperating with the larger end of the plug to keep the plug seated; and packing surrounding said stem and interposed between the said locking device and the exterior of the chamber.

2. In a valve or cock, a tapered plug extending through the valve-chamber which is provided with a suitable seat for the said plug; an actuating-stem extending from the larger end of the plug to the exterior of the chamber; a packing-gland for said stem and a locking-ring inclosed in the chamber and surrounding the said stem and bearing on the larger end of the plug, said ring being threaded to coöperate with a corresponding thread in the valve-body, substantially as described.

3. In a valve or cock, a tapered plug extending through the valve-chamber which is provided with a suitable seat for the said plug; an actuating-stem extending from the larger end of the plug to the exterior of the chamber; a packing-gland for said stem; a locking device to engage the larger end of the plug, the said locking device coöperating with the valve-body and being inclosed in the chamber and engaging the wall thereof; and means for adjusting the position of the said locking device with relation to said valve-body as set forth.

4. In a valve or cock a tapered plug extending through the valve-chamber which is provided with a suitable seat for the said plug; an actuating-stem extending from the larger end of the plug to the exterior of the chamber; a locking-ring surrounding the said stem and bearing on the larger end of the plug, said ring being threaded to coöperate with a corresponding thread in the valve-body; means for locking the said ring with relation to the said thread and a packing-gland inclosing said plug and locking device, as set forth.

5. The combination with the valve-body having an opening for a tapered plug; of a tapered seat within said body for the said plug; an internal thread in said opening beyond the said seat; a split ring having an external thread and a tapered threaded channel at the split portion; and a tapered locking-screw coöperating with the thread in said channel.

6. The combination with the valve-body having an opening for a tapered plug; of a tapered seat within said body for the said plug; an internal thread in said opening beyond the said seat; a split ring having an external thread and a tapered threaded channel at the split portion; a tapered locking-screw coöperating with the thread in said channel; and means for preventing said tapered locking-screw from working loose.

7. The combination with the valve-body having an opening for a tapered plug; of a tapered seat within said body for the said plug; an internal thread in said opening beyond the said seat; a split ring having an external thread and a tapered threaded channel at the split portion; a tapered locking-screw coöperating with the thread in said channel; a washer beyond said split ring and adapted to bear thereon; and packing beyond the said washer, substantially as described.

8. The combination with the valve-body having an opening for a tapered plug; of a tapered seat within said body for the said plug; an internal thread in said opening beyond the said seat; a locking-ring having an external thread to coöperate with said internal thread, said ring coöperating directly with said plug; an inclosing gland for the plug; and packing interposed between said gland and said locking-ring, substantially as described.

In testimony whereof I have signed my name to this specification in the presence of two subscribing witnesses.

RAGNAR L. KJERNER.

Witnesses:
NANCY P. FORD,
HENRY J. LIVERMORE.